United States Patent [19]
Pelletier et al.
[11] 4,061,833
[45] Dec. 6, 1977

[54] LATEX COATINGS FOR ELECTROGRAPHIC SHEETS

[75] Inventors: Ronald R. Pelletier, Bay City; Robert D. Hansen, Midland; James J. Vanderbush, Edenville, all of Mich.

[73] Assignee: The Dow Chemical Company, Midland, Mich.

[21] Appl. No.: 646,806

[22] Filed: Jan. 6, 1976

Related U.S. Application Data

[62] Division of Ser. No. 415,922, Nov. 14, 1973, abandoned.

[51] Int. Cl.[2] .......................... B05D 3/02; B32B 23/08; B32B 27/10

[52] U.S. Cl. .......................... 428/511; 260/29.6 WB; 260/29.6 TA; 96/1.5 R; 96/1.8; 427/391

[58] Field of Search .............. 260/29.5 WB, 29.6 TA; 96/1.8, 1.5; 427/391; 428/511

[56] References Cited

U.S. PATENT DOCUMENTS

| | | | |
|---|---|---|---|
| 3,026,217 | 3/1962 | Hechtman et al. | 427/391 X |
| 3,261,709 | 7/1966 | Shulman | 427/391 X |
| 3,544,318 | 12/1970 | Boothe et al. | 427/391 X |
| 3,583,881 | 6/1971 | Kennedy | 427/391 X |
| 3,653,894 | 4/1972 | Levy et al. | 427/391 X |

*Primary Examiner*—Michael R. Lusignan
*Attorney, Agent, or Firm*—I. A. Murphy

[57] ABSTRACT

An aqueous latex coating composition comprising a non-conductive, water-insoluble copolymer of (1) methacrylic acid or maleic acid, (2) a styrene compound, and (3) a conjugated diene hydrocarbon or an alkyl ester of methacrylic acid or of acrylic acid is coated onto a sheet which is conductive or is non-conductive but may have a conductive layer adhered thereto. Thereby, sheets having a dielectric coating for electrographic printing are produced.

6 Claims, No Drawings

LATEX COATINGS FOR ELECTROGRAPHIC SHEETS

CROSS-REFERENCE TO RELATED APPLICATIONS

This application is a division of application Ser. No. 415,922 filed Nov. 14, 1973, now abandoned.

BACKGROUND OF THE INVENTION

1. Field of the Invention

This invention is concerned with sheets coated with a water-insoluble, non-conductive copolymer of methacrylic acid or maleic acid. More particularly it relates to electrographic sheets and to processes for producing and using such materials. This invention especially relates to latex compositions useful in the preparation of sheets having a dielectric coating.

2. Description of the Prior Art

There are two general methods for the use of electrostatic charges in printing processes. One method is to apply a relatively uniform surface charge to a material capable of holding a charge, then selectively discharge the material to form a pattern of charged area. The other method is to selectively apply a surface charge in a desired pattern to a material capable of holding a charge. In either method, the desired pattern is developed by applying a material, generally colored, which adheres to the charged portion.

There is some confusion in the terminology of the prior art of printing processes which make use of electrostatic charges. For clarity, certain terms are used throughout this specification with the following meanings. Consistent with the definitions of Carlson, an early contributor to the art, the term "electrophotographic printing" is applied to printing processes utilizing photoconductivity. This process operates through selective discharging of a charged area by photoconductivity. The term "electrophotographic sheet" or "photoconductive sheet" is applied to thin materials in any desired shape or configuration having a layer of photoconductive material capable of accepting an electrostatic charge and particularly adapted for printing through use of photoconductivity. The term "electrographic printing" is applied to printing processes utilizing electrostatic charges on dielectric surfaces and does not involve photoconductivity. The term "electrographic sheet" or "dielectric sheet" is applied to thin materials in any desired shape or configuration having a dielectric layer particularly adapted for electrographic printing. In electrographic printing, selectively charging the dielectric sheet is most commonly practiced although selective discharging of a charged sheet can be carried out. The term "electrostatic sheets" includes both dielectric sheets and photoconductive sheets.

A dielectric coated sheet for electrographic printing usually is prepared by coating one surface of a substrate with an organic solution of a resin and then volatilizing the solvent to form a non-conductive, continuous film on that surface of the substrate. The substrate usually is electrically conductive or the opposite side of the sheet is coated with a conductive material. When such a sheet is subjected to a source of electrostatic charge in certain predetermined areas, the sheet accepts a charge in those areas — which must be retained for a sufficient time for a visible image to be developed on the sheet. The image is developed by depositing a toner on the surface of the coated sheet. The toner is attracted to, and adheres to, the charged portions of the sheet which, if desired, may be subjected to elevated temperatures to fuse the toner to the sheet.

The use of organic solvents in the preparation of dielectric sheets results in certain disadvantages such as toxicity and fire hazard as well as the cost of solvents. The resulting requirements for solvent recovery equipment and ventilating means also cause increases in processing costs. Some attempts have been made, therefore, to replace the volatile organic solvent with water. A problem with such systems has been that, although they operate satisfactorily at low relative humidity, they fail to hold a charge to the desired extent at high relative humidity such as above about 75 percent. Some procedures and compositions to alleviate these problems are described in U.S. Pat. No. 3,261,709 issued to Joseph Shulman and U.S. Pat. No. 3,558,544 issued to A. J. Cole et al.

SUMMARY OF THE INVENTION

The present invention provides electrostatic sheets especially adapted for electrographic printing by the steps of coating at least one surface of a substrate with an aqueous composition comprising a latex of a copolymer of from about 0.5 percent to about 8 percent of methacrylic acid or maleic acid and the balance consisting of (a) a styrene compound, (b) a conjugated diene hydrocarbon or an alkyl ester of acrylic acid or of methacrylic acid and optionally small amounts of other nonionic monomers and drying the coated sheet. In the preparation of electrostatic sheets for electrographic printing, a pigment may be blended with the latex before the coating step in an amount not greater than about 2 parts for each part of latex, calculated on a dry weight basis.

DESCRIPTION OF THE PREFERRED EMBODIMENTS

It has now been found that dielectric coated sheets for electrographic printing may be prepared by using the latex described below:

The latex is a stable, aqueous, colloidal dispersion of a polymer of copolymerized monomers consisting essentially of (1) methacrylic acid or maleic acid, (2) a styrene compound, and (3) a conjugated diene hydrocarbon especially such hydrocarbons having from 4 to 10 carbon atoms or an alkyl ester of acrylic acid or of methacrylic acid wherein the alkyl portion has from 1 to 18 carbon atoms, preferably from 4 to 10 carbon atoms. The copolymerized methacrylic acid or maleic acid constitutes from about 0.5 percent to about 8 percent, preferably from about 1 percent to about 5 percent of the copolymer weight.

The styrene compounds are styrene and alkyl-substituted styrenes such as styrene, vinyltoluene, ar-ethylstyrene, ar,ar-dimethylstyrene and p-t-butylstyrene.

Representative esters of acrylic acid and of methacrylic acid are methyl acrylate, ethyl acrylate, n-propyl acrylate, isopropyl acrylate, n-butyl acrylate, t-butyl acrylate, amyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, methyl methacrylate, ethyl methacrylate, n-propyl methacrylate, n-butyl methacrylate, t-butyl methacrylate, isobutyl methacrylate, n-amyl methacrylate, isoamyl methacrylate, hexyl methacrylate, 2-ethylbutyl methacrylate, octyl methacrylate, 2-ethylhexyl methacrylate, 3,5,5-trimethylhexyl methacrylate, decyl methacrylate, dodecyl methacrylate and octadecyl methacrylate.

The conjugated diene hydrocarbons are represented by butadiene, isoprene, 2,3-dimethyl-1,3-butadiene, 3,4-dimethyl-1,3-hexadiene, piperylene, methylpentadiene, 2-neopentyl-1,3-butadiene and 4,5-dimethyl-1,3-octadiene.

Small amounts of other non-ionic monomers may be included as copolymerized constituents of the latex, if desired. Representative such additional monomers as illustrative materials but not an all-inclusive list are acrylonitrile, methacrylonitrile, chloroprene, vinyl chloride, vinylidene chloride, acrylamide, chlorostyrene and bromostyrene.

The aqueous dispersions used in the practice of this invention are conveniently prepared from the abovedescribed monomers by conventional emulsion polymerization at acid pH using small amounts of conventional emulsifiers and free-radical producing catalysts usually in an amount from about 0.01 percent to about 3 percent, preferably from about 0.5 percent to about 1.2 percent, based on the weight of the monomers under conventional conditions of agitation, time, pressure, and temperature, using either a batchwise, incremental or continuous type addition of the monomers, water and other constituents to a reaction vessel or to a series of such vessels or by polymerization in a coil reactor. When the latex composition is to contain maleic acid, the usual procedure is to use maleic anhydride in the emulsion polymerization process which then hydrolyzes without additional process steps to form the acid. Methods using incremental or continuous addition of monomers, particularly of the methacrylic acid or maleic acid (maleic anhydride), are preferred.

The catalysts are of the type which produce free radicals and conveniently are per-oxygen compounds; for example, the inorganic persulfate compounds such as sodium persulfate, potassium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid — sometimes activated by water-soluble reducing agents such as a ferrous compound, sodium bisulfite or hydroxylamine hydrochloride — and other free radical producing materials such as 2,2′ azobisisobutyronitrile.

Emulsifiers, although not required for the invention, are often advantageously included in the aqueous dispersion for stabilization of the dispersion and/or to provide particle size control. Usually at least one anionic emulsifier is included and one or more of the known non-ionic emulsifiers may also be present. Representative types of anionic emulsifiers are the alkyl aryl sulfonates, the alkali metal alkyl sulfates, the sulfonated alkyl esters, the fatty acid soaps and the like. Specific examples of these well known emulsifiers, for the purpose of illustration and not for limitation, are dodecylbenzene sodium sulfonate, sodium butyl naphthalene sulfonate, sodium lauryl sulfate, disodium dodecyldiphenyl ether disulfonate, n-octadecyl disodium sulfosuccinate and dioctyl sodium sulfosuccinate. Other species of useful anionic emulsifying agents will be known. Typical non-ionic emulsifiers (surfactants) are compounds formed by the reaction of an alkylene oxide, such as ethylene oxide, propylene oxide, or butylene oxide with long chain fatty alcohols, long chain fatty acids, alkylated phenols, and long chain alkyl mercaptans; the alkylene oxides being reacted in a ratio such as 5 moles to 20 moles or higher such as up to 50 moles per mole of the coreactant. Similarly effective compounds are monoesters such as the reaction products of a polyethylene glycol with long chain fatty acids, for example, glycerol monostearate, sorbitan trioleate, and partial and complete esters of long chain carboxylic acids with polyglycol ethers of polyhydric alcohols. By "long chain" in the above description is meant an aliphatic group having from six carbon atoms to 20 or more. Combinations of two or more emulsifying agents from one or more of the classes may be employed if desired for special effects.

The amount of emulsifier during polymerization usually is from about 0.05 part to about 1 part preferably from about 0.1 part to about 0.8 part, for each 100 parts of monomers on a weight basis.

Sometimes part or all of these surfactants are introduced into the polymerization mixtures as a component of a preformed seed latex. In such a process, to small amounts of a seed latex are added water, constituent monomers, the free-radical producing catalysts and any other ingredients of the emulsion polymerization recipe in an incremental or a continuous manner while maintaining agitation of the contents of the polymerization zone under conditions of pressure suitable for the monomeric composition being used and at a temperature suitable for the particular catalyst system being used, such temperatures usually being between about 0° C and 115° C.

Conventional additives for latex compositions may be included in small but usual amounts and in a known manner. Such materials include, but are not restricted to, chain transfer agents, short stopping agents, buffers, antifoaming agents, chelating agents, plasticizers, tinting materials, bactericides, or other preservatives and the like.

The aqueous dispersions, i.e., the latex compositions, usually are prepared at a solids content of from about 30 percent to about 70 percent, preferably from about 40 percent to about 55 percent by weight.

The particle size of the latex usually ranges from about 1300 Angstroms to about 2500 Angstroms although larger or smaller particle sizes are suitable.

In the preparation of the electrographic sheets, the latex as described above may be coated on the substrate directly and dried to form a dielectric coating or the latex may be mixed with a pigment in any amount up to a ratio of about 2 parts, preferably up to about 1 part, of pigment for each part of latex, calculated on a dry solids basis. The pigments are finely divided materials, usually white or near-white in color, and are represented by clays such as of the kaolin type or china clay, calcium carbonate, titanium dioxide, talc, zinc oxide, and barium sulfate. If the pigments contain significant quantities of water-soluble materials, particularly ionic materials, they should be washed with water to remove the contaminants before being dispersed in the latex.

In the preparation of the electrographic sheets any pigments which are used usually are pre-dispersed in water with the aid of a pigment dispersant such as potassium tripolyphosphate, tetrasodium pyrophosphate and ammonium salts of styrene/maleic anhydride copolymers. The pigment dispersion is then blended with the latex in the desired ratio.

The pigmented or unpigmented aqueous coating compositions for electrographic sheets are applied to the desired substrate using conventional coating equipment such as an air knife, roll coater, or blade coater and the coated sheets are then dried by any convenient method; for example, by steam heated rolls, tunnel driers, infrared heaters or dielectric driers.

A preferred substrate for the electrostatic sheets of this invention is a paper sheet. The paper sheet to which the above-described coating is applied may be sized on one or both sides and/or may be treated with hygroscopic salts, electroconductive resins, carbon black, metallic powders and the like to increase the electrical conductivity of the paper. The invention is not limited to the use of paper as the substrate, however, and other conventional substrates, which may be either flexible or rigid and of any desired shape, are operable. Ordinarily, the substrate is electrically conductive or semiconductive. The substrate may be, for example, sheets of electrically conductive plastic, or metal. Electrically non-conductive sheets of plastic such as of polyethylene terephthalate, or of glass, usually are coated on one or both sides with an electrically conductive layer in addition to the dielectric coating required for this invention. If an electrically conductive layer is not adhered to a non-conductive substrate to which the dielectric coating is applied, an electroconductive support must be in intimate contact with the sheet while the printing process is being carried out.

The electrographic sheets are used for printing in the conventional manner known to the art. In the electrographic process, the electrostatic sheet is subjected to a source of electrostatic charge in the desired predetermined areas to produce an electric charge in those areas, which is held for a sufficient time for a visible image to be developed on the sheet. A common method of image formation is by selectively energizing pin electrodes in a print head mounted from 3 to 35 thousandths of an inch from the dielectric surface of the sheet. The image is developed by depositing a toner on the surface of the coated sheet which adheres to the charged portion of the sheet. The treated sheet may be heated for a short time at a temperature sufficiently high to fuse the particles in the toner to the sheet.

The toners used in electrographic printing are of the kind known to the art and consist generally of charged particles containing a resin and a colored material such as carbon black. In a liquid development system, the particles are suspended in an insulating organic liquid such as kerosene or mineral spirits. The liquid suspension is applied on the sheet either by spraying it on the sheet or by dipping the sheet into the liquid suspension. Most of the excess liquid is allowed to drain from the sheet and the remainder often is removed by a current of air which may be warm. In a dry system the thermoplastic toner particles often are mixed with iron particles and the mixture then is contacted with a magnet. The resulting "magnetic brush" is swept across the coated sheet having the selectively charged areas and the toner particles adhere to the charged areas whereas the iron particles remain on the magnet. Excess toner particles then generally are brushed from the sheet and the particles adhering to the charged areas are fused to the substrate by heating.

The following examples are given to illustrate more clearly the principle and practice of this invention to those skilled in the art and are not for purposes of limitation. Throughout the specification, including the claims, all parts and percentages are by weight unless otherwise indicated. Also unless otherwise indicated, references to a ream are to a ream of 3000 square feet.

EXAMPLE 1

For Example 1, to a latex containing a copolymer of 61 parts of styrene, 38 parts of butadiene and 1 part of methacrylic acid is added sufficient ammonium hydroxide to adjust the pH to a value of 8.5 ± 0.5 and sufficient water to provide a solids content of 50 percent. The latex is coated with a wire-wound rod at two different coating weights onto a sized base stock having a basis weight of 46 pounds per ream. The coated sheets are then dried in an air oven at 105° C for 2 minutes and weighed to determine the amount of coating applied. The sheets are coated on the reverse side with an electroconductive polymer of poly(vinylbenzyltrimethyl ammonium chloride) at a coating weight of about 0.5 pound per ream. The resulting coated paper is tested by cutting circular samples one-inch in diameter and measuring the charge acceptance and decay rate, using a Most Stati-Tester, Model 169. In that instrument, the circular samples of dielectric paper are mounted on a circular plate which accepts two samples. In the test, that plate spins about its axis with the dielectric side of the samples first being exposed to a corona discharge to charge the surface of the coated sheet then passing over two electrometer heads which measure the potential residing on the surface of the sample. The potential measured by the electrometer heads is plotted on a recorder chart as a function of time. The charge acceptance and charge after 120 seconds decay are shown in Table I. The charge acceptance is the maximum potential before the potential begins to decay. The charge after 120 seconds is the residual charge remaining after a decay time of 120 seconds measured from the time the maximum potential is attained.

Included also in Table I are data for comparative examples 1*a*, 1*b* and 1*c*. These comparative examples are prepared from the same materials by the same procedure and tested in the same manner as for Example 1 except that the starting latex contains one part of copolymerized fumaric acid, itaconic acid and acrylic acid, respectively, rather than one part of copolymerized methacrylic acid.

TABLE I

| Ex. No. | Copolymerized Acid | Coating Weight lb/ream | Charge[a] Acceptance Volts | Charge[a] After 120 Sec. Volts |
|---|---|---|---|---|
| 1 | Methacrylic | 4.0 | 310 | 135 |
| | | 6.0 | 470 | 320 |
| *1a | Fumaric | 3.9 | 175 | 25 |
| | | 6.0 | 410 | 100 |
| *1b | Itaconic | 4.1 | 160 | 18 |
| | | 6.1 | 420 | 100 |
| *1c | Acrylic | 3.9 | 130 | 5 |
| | | 6.1 | 450 | 70 |

*Not examples of this invention.
[a]Tested at 50% relative humidity.

The charge acceptance and charge retained after 2 minutes decay are considerably greater for the composition of this invention (having copolymerized methacrylic acid) than the comparative compositions having copolymerized fumaric acid, itaconic acid or acrylic acid.

EXAMPLE 2

The latex according to Example 1 is coated in the same manner on the same kind of base stock as in Example 1 at a coating weight of 5.5 ± 0.1 pounds per ream. The reverse side of the sheet also is coated as in Example 1. An image is placed on the coated sheet under controlled humidity conditions in an electrographic printing device consisting of a magnesium printing plate placed in contact with the dielectric side of the sheet and a sheet of aluminum foil in contact with the conductive side of the sheet. A 600-volt direct current supply is connected so that the negative potential is connected to the magnesium printing plate, the positive potential to the aluminum foil and then a rubber roller is passed over the magnesium plate to insure good electrical contact. After the circuit is opened, the resulting charged sheet of paper is removed and dipped into a toner solution prepared by diluting a toner concentrate 50-fold by volume with an isoparaffinic hydrocarbon. The toner is a colloidal dispersion of particles having a positive charge. These positively charged particles are attracted to the negative charges previously imparted to the sheet. The excess toner solution is then drained from the treated paper. After being blotted with cleansing tissue, the sheet is then allowed to dry in air at ambient temperature. Comparative examples 2*a*, 2*b* and 2*c* are carried out in the same manner except that the latexes described in comparative examples 1*a*, 1*b* and 1*c*, respectively, are used.

When the coated sheets are tested at 50 percent relative humidity (R.H.), it is found that the images from the compositions of the invention (with copolymerized methacrylic acid) show both good contrast and good resolution whereas the images from the comparative examples (2*a*, fumaric acid; 2*b*, itaconic acid; and 2*c*, acryvic acid) are dark and have poor resolution. When the test is carried out at 75 percent relative humidity it is found that the image using the compositions of the invention (copolymerized methacrylic acid) has good contrast and good resolution whereas with all of the comparative composition the images are badly smeared.

EXAMPLE 3

Dielectric coated papers are prepared as described for Example 1 and comparative examples 1*a*, 1*b* and 1*c* except that the amount of copolymerized acid (Example 3, methacrylic acid; comparative example 3*a*, fumaric acid; 3*b*, itaconic acid; 3*c*, acrylic acid) is 4 parts instead of 1 part and the styrene is 58 parts. When the process for obtaining images on the coated papers is carried out as described for Example 2 at 50 percent relative humidity, it is found that no images are obtained for the compositions containing copolymerized fumaric acid and itaconic acid. Images of good contrast and good resolution are obtained for the compositions containing copolymerized methacrylic acid (Example 3) and acrylic acid (comparative example 3*c*).However, at 75 percent relative humidity, a better image, although smeared, is obtained with the composition containing copolymerized methacrylic acid than with the composition containing acrylic acid.

EXAMPLE 4

Various paper sheets having a dielectric coating are prepared and coated as described in Example 1 at coating weights of 6–8 pounds per ream except that the starting latex contains a copolymer of maleic acid prepared from 58 parts of styrene, 39 parts of butadiene and 3 parts of maleic anhydride, the maleic anhydride being hydrolyzed to the acid form during the process of latex preparation. Images having good contrast and good resolution are obtained on the papers by the process described in Example 2 at relative humidities from 50 to 85 percent.

EXAMPLE 5

Coated paper sheets are obtained as described in Example 4 at coating weights of 7–12 pounds per ream except that starting latex is mixed with an equal quantity on a dry weight basis of a pigment dispersion prepared from 65 parts of Lithopone 40 M (a $BaSO_4$—ZnS coprecipitate), 0.3 part of the ammonium salt of a styrene-maleic anhydride copolymer and 35 parts of water. When the process for obtaining images on coated papers is carried out as described in Example 2, it is found that very sharp images with very good resolution are obtained at 50 percent and at 75 percent relative humidity. The images at 85 percent relative humidity are of intermediate contrast and resolution.

EXAMPLE 6

Paper sheets having a dielectric coating at a coating weight of 3.7 and 5.0 pounds per ream are obtained as described in Example 2 except that the latex contains a copolymer of 47 percent of styrene, 50 percent of butyl acrylate and 3 percent of methacrylic acid. Images with good contrast and good resolution are obtained on the coated sheets at 50 percent, 75 percent and 85 percent relative humidity. A sample with a coating weight of 3.7 pounds per ream is found to have a charge acceptance of 660 volts and a residual charge of 220 volts after 2 minutes decay when tested on the Most Stati-Tester as described in Example 1.

EXAMPLE 7

Coated papers are obtained at coating weights of 3.4, 5, and 7 pounds per ream as described in Example 1 (except that the latex contained a copolymer of 55 percent of styrene, 40 percent of butadiene and 5 percent of methacrylic acid). Images are obtained thereon according to the procedure of Example 2 at relative humidities of 50 percent, 75 percent and 85 percent. The images at 50 and 75 percent relative humidity show good contrast and resolution whereas those at 85 percent relative humidity show moderate contrast and good resolution. A sheet with a coating weight of 5.7 pounds per ream has a charge acceptance of 560 volts and a residual charge of 280 volts after 2 minutes decay when tested as described in Example 1.

EXAMPLE 8

Coated papers are obtained at coating weights of 3.8 pounds and at 5.4 pounds per ream according to Example 1 except the latex contained a copolymer of 60 percent of styrene, 39 percent of butadiene and 1 percent of methacrylic acid. Images are obtained on the coated papers as described in Example 2 at percent relative humidities of 50, 75 and 85. At 50 and at 75 percent relative humidity, good contrast and good resolution are found whereas at 85 percent relative humidity medium contrast and medium resolution are obtained. A sheet coated at 5.4 pounds per ream is found to have a charge acceptance of 340 volts and a residual charge after 2 minutes decay of 85 volts when tested according to Example 1.

EXAMPLE 9

Coated paper sheets having coating weights of 3.5, 6.1 and 7.6 pounds per ream are prepared as described in Example 1 except that the polymer component of the latex is a copolymer of 55 percent of styrene, 41 percent of butadiene, 3 percent of acrylonitrile and 1 percent of methacrylic acid. By the process of Example 2, images are obtained at 50, 75 and 85 percent relative humidity. Images on sheets coated at 3.5 pounds per ream are obtained having good contrast and good resolution at all of the relative humidity values. The sheets having coat weights of 6.1 and 7.6 pounds per ream produce images having poor resolution but good contrast at all of the relative humidity values.

In Examples 1-9, the coating weights on paper are expressed in pounds per ream of 3000 square feet. When substrates are used which are measured in units other than a ream, substantially the same weights per equivalent surface are used. For example, in electrographic sheets, from about 1 pound to about 8 pounds, preferably from about 2 pounds to about 4 pounds, of the copolymer per 3000 square feet of surface are applied, calculated on a dry weight basis when no pigment is used. When a pigment is used the corresponding amount of copolymer plus pigment is from about 2 pounds to about 12 pounds, preferably from about 3 pounds to about 9 pounds, per 3000 square feet.

That which is claimed is:

1. An electrostatic sheet suitable for electrographic printing comprising a substrate in the form of a flexible or rigid sheet having adhered to at least one surface thereof a continuous dielectric film consisting essentially of a copolymer of from about 0.5 percent to about 8 percent of methacrylic acid of maleic acid and the balance consisting essentially of (a) a styrene compound and (b) a conjugated diene hydrocarbon or an alkyl ester of acrylic acid or of methacrylic acid; said alkyl ester having from 1 to 18 carbon atoms in the alkyl.

2. The electrostatic sheet of claim 1 in which the film includes a pigment in an amount not greater than about 2 parts for each part of the copolymer.

3. The electrostatic sheet of claim 1 in which the amount of copolymerized methacrylic acid or maleic acid is from about 1 percent to about 5 percent.

4. The electrostatic sheet of claim 3 in which the copolymer is a copolymer of methacrylic acid.

5. The electrostatic sheet of claim 1 in which the substrate is paper.

6. The electrostatic sheet of claim 1 in which the substrate also is coated with or impregnated with an electroconductive material.

* * * * *